March 7, 1939.  F. KRONER  2,149,779

PICTORIAL REPRESENTATION

Filed Dec. 18, 1935　　2 Sheets-Sheet 1

Inventor:
Friedrich Kroner

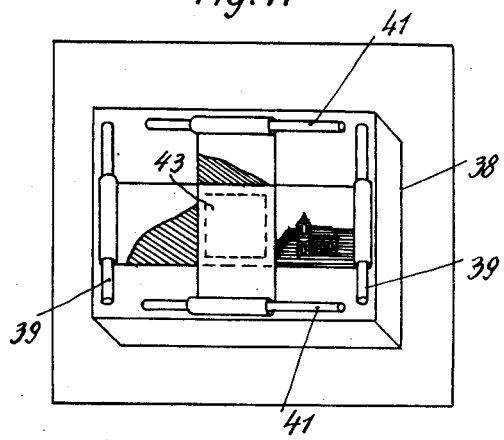
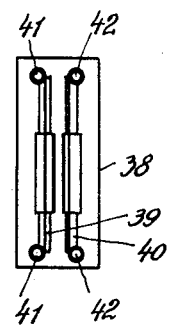
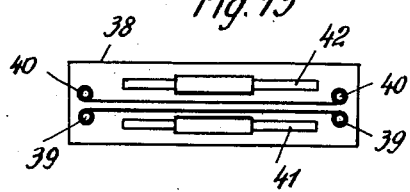
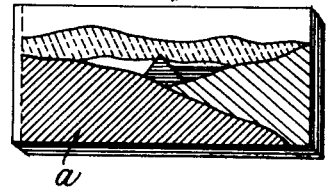
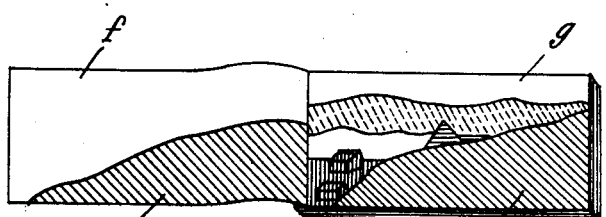

Patented Mar. 7, 1939

2,149,779

UNITED STATES PATENT OFFICE 2,149,779

PICTORIAL REPRESENTATION

Friedrich Kroner, Berlin-Charlottenburg, Germany, assignor to Transart Aktiebolag, Goteborg, Sweden Application December 18, 1935, Serial No. 54,963
In Great Britain December 19, 1934

3 Claims. (Cl. 40—135)

My invention relates to the pictorial representation of objects and more particularly consists in a novel method and device for that purpose.

A principal object of the present invention is to produce the pictorial representation of an object or objects by means of superposed very thin transparent sheets on which are provided opaque pictures of the various objects, which pictures are situated in the plane of the transparent sheets so as to be equally visible at the front and the rear of the sheets. In this way, as the transparent sheets being arranged in a definite sequence are turned over an object, an organism or the like, may be viewed in various stages of its growth or development or at various times.

In order that the present invention may be fully understood and be more readily carried into effect, some embodiments thereof will now be described with reference to the accompanying drawings, in which Figs. 1 to 5 represent five individual transparent sheets bearing various pictorial representations and together forming a set.

Figs. 11 to 13 illustrate a device, whereby the present invention can be carried into effect in the modified manner.

Fig. 14 illustrates a modified form of my invention wherein the sheets are bound in book form, and Fig. 15 is a similar view showing the first sheet turned over.

Figure 1:
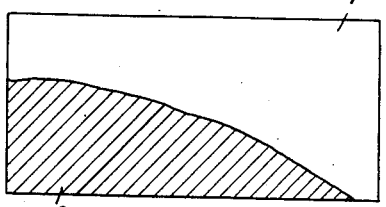
Figure 2:
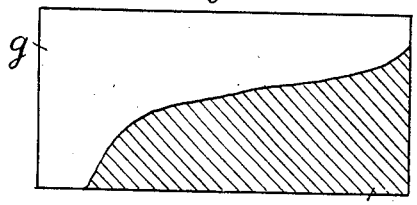
Figure 3:
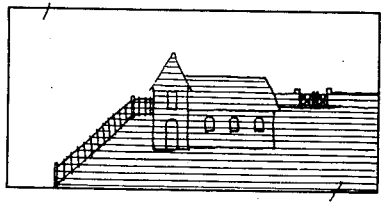

In accordance with the present invention the pictorial representation on each of the transparent sheets is opaque which is indicated in Figs. 1 to 3 by the hatching $a$, $b$, $c$, $d$ and $e$ respectively. The transparents sheets are made from thin Celluloid, or the like, and preferably of the material known by the trade-mark "Cellophane", the sheets being indicated in the various figures of the drawings by the reference letters $f$, $g$, $h$, $i$ and $k$ respectively.

Obviously for the production of the substantially non-transparent pictorial representation any desired process may be employed. Preferably, a mechanical or chemical process of reproduction will be used, e. g. a printing process. In the selected example it has been assumed, that the inks, used in the production of the pictorial print, are opaque in themselves. In consequence of the transparency of the sheets the identical picture will be visible both at the front and back of each sheet.

Furthermore, the pictorial representation on each of the five sheets has been so chosen, as it would appear, for instance, during the contemplation of a landscape from different positions of the spectator.

Figure 10:
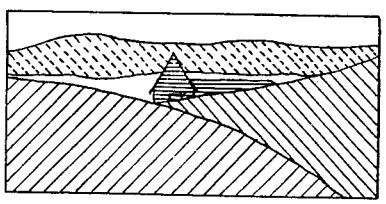
Fig. 10 represents the joint contemplation of the superposed sheets shown in Figs. 1 to 5 when viewed from the front.

If then all the five sheets are superposed and jointly contemplated, as it has been represented in Fig. 10, the spectator will have before his eyes a picture as it would present itself to him at the starting point of a rambling walk, in which he will be able to see all the objects in the foreground. Of the objects further removed, he will be able to see only those portions which are not covered by the objects in the foreground. Of the pictorial representation of the sheet $g$ he can see now only those portions which are not covered up by the representation of sheet $f$. Of the representation of sheet $h$ the spectator can see only those portions which the overlying sheets $f$ and $g$, i. e. the opaque representations on these sheets, leave uncovered, and so forth.

Figure 6:
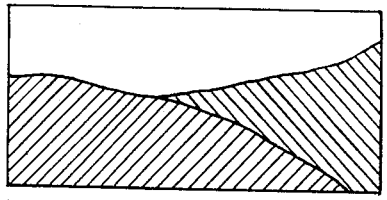
Fig. 6 represents the joint contemplation of the superposed sheets shown in Figs. 1 and 2.
Figure 7:
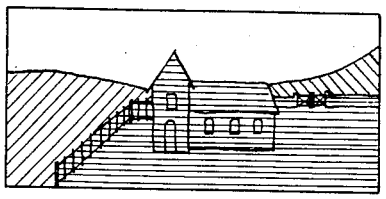
Fig. 7 represents the joint contemplation of the superposed sheets shown in Figs. 1, 2 and 3 when viewed from the back, whilst
Figure 8:
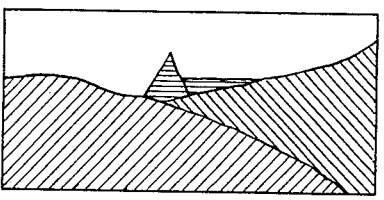
Fig. 8 represents the joint contemplation of the superposed sheets shown in Figs. 1, 2 and 3 from the front.
Figure 4:
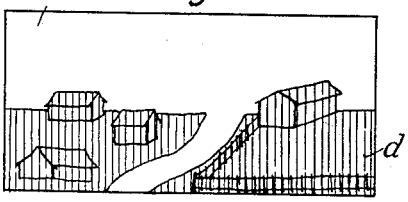
Figure 9:
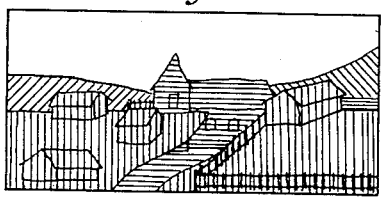
Fig. 9 shows the joint contemplation of pictures 1, 2, 3 and 4 when viewed from the back.
Figure 5:
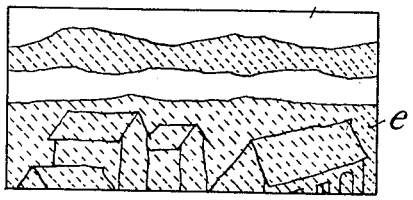

If a set of 5 sheets such as shown by Figs. 1–5 is bound, for instance, in book form and the spectator turns over the first sheet $f$, this will resemble the same procedure, as if the spectator had in reality covered a certain distance leading from his original point of view to a point situated behind the objects represented by the picture $a$ on sheet $f$, but in front of the objects represented by picture $b$. In this position the pictorial representation $b$ of sheet $g$ is completely in view of the spectator. Of the portions still lying underneath, however, only those are visible which are not covered up by the portions superimposing them. The spectator now continues his ramble, by turning over sheet after sheet. The effect resulting therefrom will be described with reference to Figs. 7 and 9. In Fig. 7 it has been assumed, that the spectator has turned over the first sheets $f$, $g$ and $h$, so that he can contemplate the sheet $i$ in its totality and the pictorial representation $e$ of sheet $k$ in so far as they are not covered up by the pictorial representation $d$ of the overlying sheet $i$. If in this position, for instance, the spectator looks at the sheets $f$, $g$, $h$ already turned over, he will see the same picture, as the rambler would in seeing a real landscape, if he were to turn round at that point. It is no longer the mountains which are situated in the foreground in Fig. 7 as it was when the spectator started upon the ramble (Fig. 6) or at the corresponding contemplation of the first three sheets (Fig. 8), but the church which the rambler has passed at this moment. The mountains represented on sheets *f* and *g*, are now forming the background. Whilst the greatest portion of the mountain *b* was at first covered up by the mountain *a* (Fig. 6), the mountain *b* (and the church situated in front of it), will now cover up the mountain *a*.

From the foregoing description it will be gathered that in accordance with the present invention a perfectly natural way of contemplation, for instance, of a landscape, will be rendered possible. The present invention renders also possible, furthermore, an improvement of this effect, inasmuch as on the back of the individual sheets a pictorial representation may be provided differing from that on the front of the same sheet. Generally speaking, the front of a house, of a mountain or of any other object, will, in nature, differ from the back thereof. This fact can be allowed for by the back of each sheet being provided with a special representation. Considering, that each of the two representations provided on opposite sides of the individual sheets are opaque, a mutual disturbance of the two representations need not be anticipated.

Preferably the individual transparent sheets are mounted in book form, for example, as shown in Figs. 14 and 15, that is to say, they are hinged along a common edge, although this is of course not absolutely necessary. In some cases, it may be desirable to so arrange the sheets that they can be superposed in different sequences in which case, a number of sheets can be attached to different edges of a base sheet, so that any one sheet, attached for instance to one edge, can be folded onto any sheet attached to another edge. Moreover, a non-transparent blank can be provided, which can be inserted underneath any of the transparent sheets, so that the matter on the individual transparent sheets or a smaller number of sheets, can be viewed separately. The individual sheets of a set can also be placed loosely into a box, or they may be folded together in any desired manner to form a continuous strip.

My method can be utilized not only for the pictorial representation of successive objects in space, but also of successive objects or events in time. In that case the bottom sheet suitably carries that portion of a desired representation, common to all representations. The sheets superposed thereon will then contain in each case those parts of the total representation which, for instance, whilst carrying a process into effect, picture the separate phases of this process.

The superposed sheets can also be adapted to be displaced relatively to each other, be it, for producing a kind of perspective effect particularly in connection with the representation of spacial relations and phenomena, be it, to thereby illustrate different possibilities of the phenomena or of the represented process. In the latter case the carrying into practice of the present invention by means of transparent strips which can be made to move along in several layers in super- or juxta-position by means of rollers, is of special importance. In this way it will not only be possible to effect the representation of different objects or processes at the same point, i. e. at the crossing point for viewing or also for projection of the different strips, but this means may also be used to serve to represent one and the same phenomenon in a larger number of variations. The operation of the rollers may be effected either by hand or by mechanical means. For instance, two picture strips may be guided horizontally by two pairs of rollers, whilst two other picture strips may be guided in a vertical direction by two other pairs of rollers, so that four picture strips are made to run crosswise. The crossing point is then the place, where the desired representation appears. The form of performance can also be of particular importance for the toy industry, as for example, for use in conjunction with small stages with wall decorations or other processes of a pictorial nature. The device just described, further offers special possibilities for the production of trick films, because in this case the pictured sequence of tricks can be conveyed in a most convenient manner to the point required for the scene.

The device described above particularly enables one or a plurality of pictures to remain at a standstill while only one or a few of the other picture strips are moved, so that also in this case the most different combinations are possible.

A device of this nature has been shown by way of example in Figs. 11, 12 and 13, according to which figures four picture strips have been so arranged, as to cross each other at the point 43, at which place the respective picture combination can be viewed. The four picture strips are wound on or off pairs of rollers 39, 40, 41, 42. The whole of the device is suitably housed in a casing 38.

What I claim, is:

1. A plurality of very thin transparent sheets in the shape of continuous webs adapted to be moved in superposed relation to each other and at various angles relative to each other, each sheet bearing a succession of opaque pictorial representations of same objects lying entirely in the plane of the sheet so as to be seen equally clearly from the front and rear of the sheet, said sheets when superposed in any desired order showing different composite pictures as viewed from the topmost sheet of a number of superposed sheets and as viewed from the bottom sheet, or any intermediate sheet.

2. A pictorial device comprising a plurality of very thin transparent flexible sheets, each bearing on either side within the same contours an opaque pictorial representation of some object lying entirely in the plane of the sheet, the pictorial representation on one side of each sheet depicting an object from one point of view and the pictorial representation on the other side of said sheet depicting the same object from the reverse point of view, the pictorial representations on the two sides of one sheet forming composite pictures with the pictorial representations on corresponding sides of one or more of the other sheets when assembled therewith in superposed relationship in immediate contact with each other, the composite pictures being variable, depending on the sequence of the assembled sheets.

3. A pictorial device comprising a plurality of very thin transparent flexible sheets assembled in book form, each bearing on either side within the same contours an opaque pictorial representation of some object lying entirely in the plane of the sheet, the pictorial representation on one side of each sheet depicting an object from one point of view and the pictorial representation on the other side of said sheet depicting the same object from the reverse point of view, the pictorial representations on the two sides of one sheet forming composite pictures with the pictorial representations on either side of one or more of the other sheets when assembled therewith in superposed relationship in immediate contact with each other.

FRIEDRICH KRONER.